US012621115B2

(12) United States Patent (10) Patent No.: US 12,621,115 B2
Chen et al. (45) Date of Patent: May 5, 2026

(54) SWITCHING AMONG MULTIPLE COMPONENT CARRIERS

(71) Applicant: QUALCOMM Incorporated, San Diego, CA (US)

(72) Inventors: Bo Chen, Beijing (CN); Wei Guan, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 714 days.

(21) Appl. No.: 17/921,878

(22) PCT Filed: Jun. 30, 2020

(86) PCT No.: PCT/CN2020/099177
§ 371 (c)(1),
(2) Date: Oct. 27, 2022

(87) PCT Pub. No.: WO2022/000249
PCT Pub. Date: Jun. 6, 2022

(65) Prior Publication Data
US 2023/0171077 A1 Jun. 1, 2023

(51) Int. Cl.
*H04L 5/00* (2006.01)
*H04W 72/1263* (2023.01)

(52) U.S. Cl.
CPC ............ *H04L 5/0098* (2013.01); *H04L 5/001* (2013.01); *H04L 5/0092* (2013.01); *H04W 72/1263* (2013.01)

(58) Field of Classification Search
CPC ..... H04L 5/0098; H04L 5/001; H04L 5/0092; H04W 72/1263
See application file for complete search history.

(56) References Cited

U.S. PATENT DOCUMENTS 10,455,558 B2 10/2019 Rico Alvarino et al.
2016/0302203 A1* 10/2016 Liu ........................ H04L 5/0098
(Continued)

FOREIGN PATENT DOCUMENTS

CN 102986273 A 3/2013
CN 107667557 A 2/2018
(Continued)

OTHER PUBLICATIONS

Huawei, et al., "Carrier Configuration for UE Support of Carrier Selection," 3GPP TSG RAN WG1 Meeting #82, R1-154347, Aug. 24-28, 2015 (Aug. 28, 2015) sections 1-2, 3 pages.
(Continued)

*Primary Examiner* — Basil Ma
(74) *Attorney, Agent, or Firm* — Patterson + Sheridan, L.L.P.

(57) ABSTRACT

Aspects of the present disclosure provide apparatus, methods, processing systems, and computer readable mediums for configuring, based on capability of the user equipment (UE) in switching among multiple component carriers (CCs), the UEs for communications with multiple activated CCs. For example, the network may configure the UE with a number of activated CCs that exceeds a number of CCs supported by the UE for simultaneous connections, such that the UE quickly switches among the activated CCs. The UE can thus effectively utilize more operating bands than the number allowed for simultaneous connections using interband carrier aggregations.

17 Claims, 11 Drawing Sheets

(56) References Cited

U.S. PATENT DOCUMENTS

| | | | |
|---|---|---|---|
| 2018/0098358 A1 | 4/2018 | Rico Alvarino et al. | |
| 2020/0154412 A1* | 5/2020 | Lee ........................ | H04W 72/23 |
| 2020/0344030 A1* | 10/2020 | Cheng .............. | H04W 72/0453 |

FOREIGN PATENT DOCUMENTS

| | | | |
|---|---|---|---|
| WO | 2017196546 | 11/2017 | |
| WO | 2019095251 | 5/2019 | |
| WO | WO-2019095251 A1 * | 5/2019 | ............ H04W 28/20 |

OTHER PUBLICATIONS

Huawei, et al., "Carrier Configuration for UE Support of Carrier Selection," 3GPP TSG RAN WG1 Meeting #82bis, R1-155069, Oct. 5-9, 2015 (Oct. 9, 2015) sections 1-2, 3 pages.
Huawei, et al., "L1 Indication for UE Support of Fast Carrier Selection," 3GPP TSG RAN WG1 Meeting #82, R1-154326, Aug. 24-28, 2015 (Aug. 28, 2015) sections 1-2, 3 pages.
Huawei, et al., "L1 Indication for UE Support of Fast Canier Selection," 3GPP TSG RAN WG1 Meeting #82bis, R1-155070, Oct. 5-9, 2015(Oct. 9, 2015) sections 1-2, 3 pages.
International Search Report and Written Opinion—PCT/CN2020/099177—ISA/EPO—Mar. 25, 2021.
Supplementary European Search Report—EP20942528—Search Authority—Feb. 22, 2024.

* cited by examiner

700

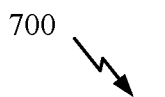

702

RECEIVE, FROM A USER EQUIPMENT (UE), CAPABILITY SIGNALING INDICATING A CAPABILITY OF THE UE IN SWITCHING AMONG MULTIPLE COMPONENT CARRIERS (CCS)

704

CONFIGURE THE UE WITH A NUMBER OF ACTIVATED CCS THAT EXCEEDS A NUMBER OF CCS SUPPORTED BY THE UE FOR SIMULTANEOUS COMMUNICATIONS

706

SCHEDULE THE UE FOR COMMUNICATIONS ON THE ACTIVATED CCS, BASED ON THE INDICATED CAPABILITY OF THE UE TO SWITCH AMONG CCS

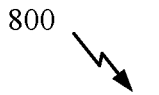

802

TRANSMIT, TO A NETWORK ENTITY, CAPABILITY SIGNALING INDICATING A CAPABILITY OF THE UE IN SWITCHING AMONG MULTIPLE COMPONENT CARRIERS (CCS)

804

RECEIVE SIGNALING CONFIGURING THE UE WITH A NUMBER OF ACTIVATED CCS THAT EXCEEDS A NUMBER OF CCS SUPPORTED BY THE UE FOR SIMULTANEOUS COMMUNICATIONS

806

SWITCH AMONG CCS FOR COMMUNICATIONS ON THE ACTIVATED CCS, IN ACCORDANCE WITH THE INDICATED CAPABILITY OF THE UE TO SWITCH AMONG CCS

FIG. 8

SWITCHING AMONG MULTIPLE COMPONENT CARRIERS

CROSS-REFERENCE TO RELATED APPLICATIONS

This application is a national stage application under 35 U.S.C. 371 of PCT/CN2020/099177, filed Jun. 30, 2020, which is hereby expressly incorporated by reference herein in its entirety as if fully set forth below and for all applicable purposes.

FIELD OF THE DISCLOSURE

Aspects of the present disclosure relate to wireless communications, and more particularly, to techniques of utilizing multiple operating bands.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include optimizing or maximizing bandwidth or data rates of a user equipment (UE) by configuring the UE to quickly switch among multiple component carriers (CCs).

Certain aspects provide a method for wireless communication by a network entity. The method generally includes receiving, from a UE, capability signaling indicating a capability of the UE in switching among multiple component carriers (CCs), configuring the UE with a number of activated CCs that exceeds a number of CCs supported by the UE for simultaneous communications, and scheduling the UE for communications on the activated CCs, based on the indicated capability of the UE to switch among CCs.

Certain aspects provide a method for wireless communication by a UE. The method generally includes transmitting, to a network entity, capability signaling indicating a capability of the UE in switching among multiple CCs, receiving signaling configuring the UE with a number of activated CCs that exceeds a number of CCs supported by the UE for simultaneous communications, and switching among CCs for communications on the activated CCs, in accordance with the indicated capability of the UE to switch among CCs.

Certain aspects provide means for, apparatus, and/or computer readable medium having computer executable code stored thereon, for techniques described herein for fast switching among multiple CCs.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 7 illustrates example operations that may be performed by a network entity, in accordance with certain aspects of the present disclosure.

FIG. 8 illustrates example operations that may be performed by a UE, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
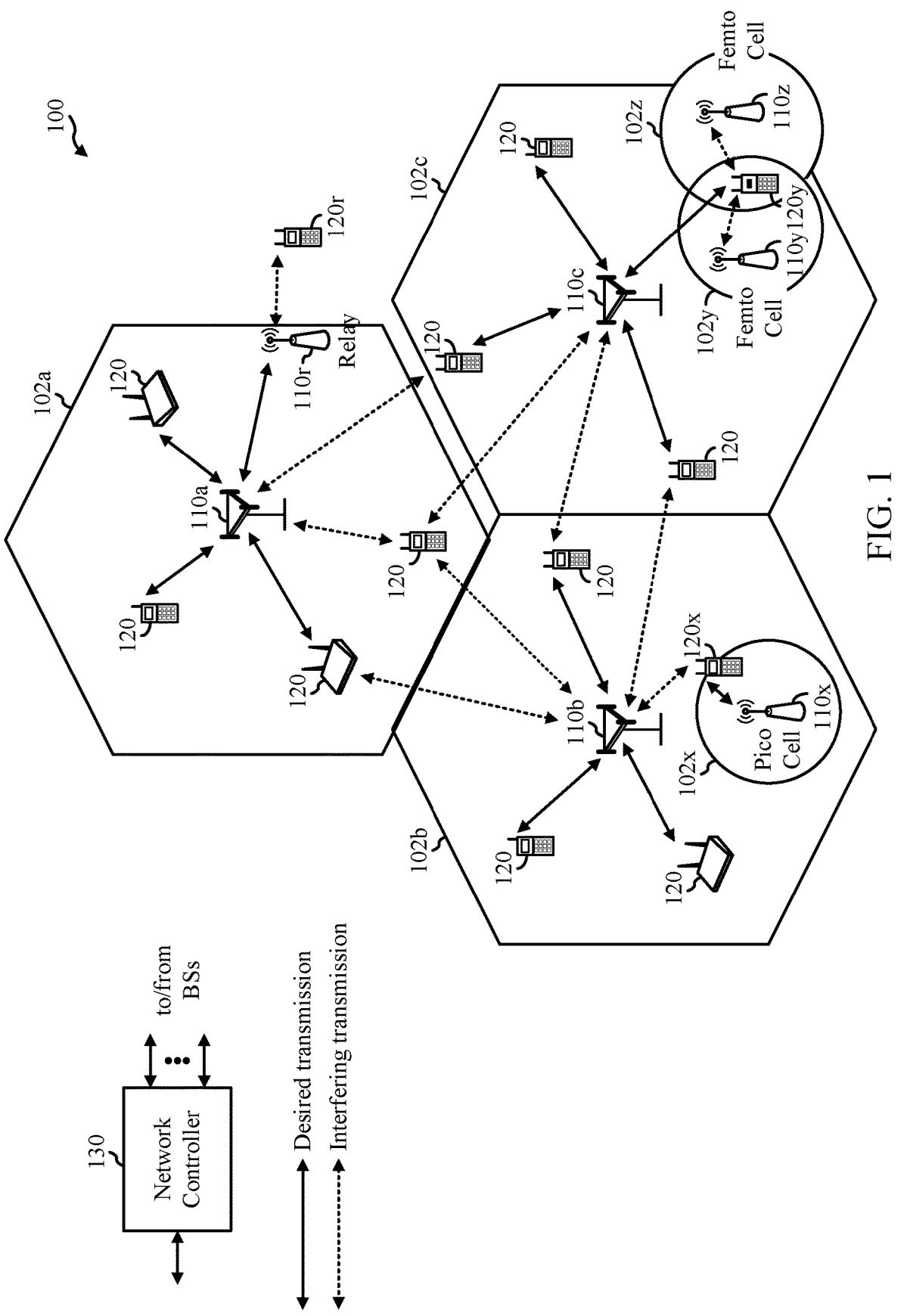
FIG. 1 is a block diagram conceptually illustrating an example telecommunications system, in accordance with certain aspects of the present disclosure.

Aspects of the present disclosure provide apparatus, methods, processing systems, and computer readable mediums for configuring, based on capability of the user equipment (UE) in switching among multiple component carriers (CCs), the UEs for communications with multiple activated CCs. For example, the network may configure the UE with a number of activated CCs that exceeds a number of CCs supported by the UE for simultaneous connections, if the UE indicates a capability to quickly switch among the activated CCs. The UE can thus effectively utilize more operating bands than the number allowed for simultaneous connections using inter-band carrier aggregations. This may allow for cost-effective performance improvements with a limited number of radio frequency (RF) chains.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, UEs 120 may be configured to perform operations 800 of FIG. 8 to switch among multiple component carriers (CCs) and communicate with BSs 110, while BSs 110 may perform operations 700 of FIG. 7 to schedule the UEs 120 for communications on the activated CCs.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
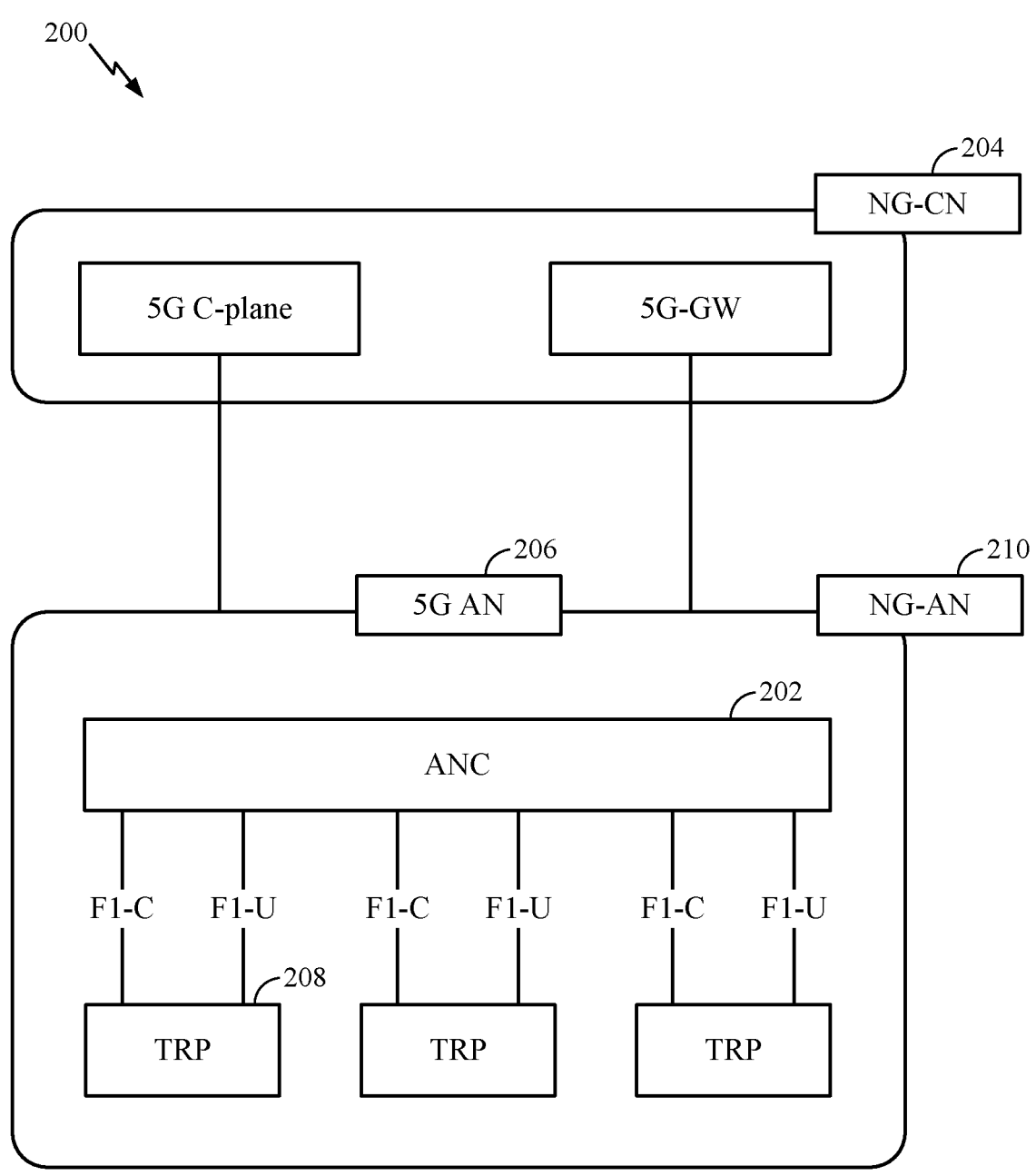
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
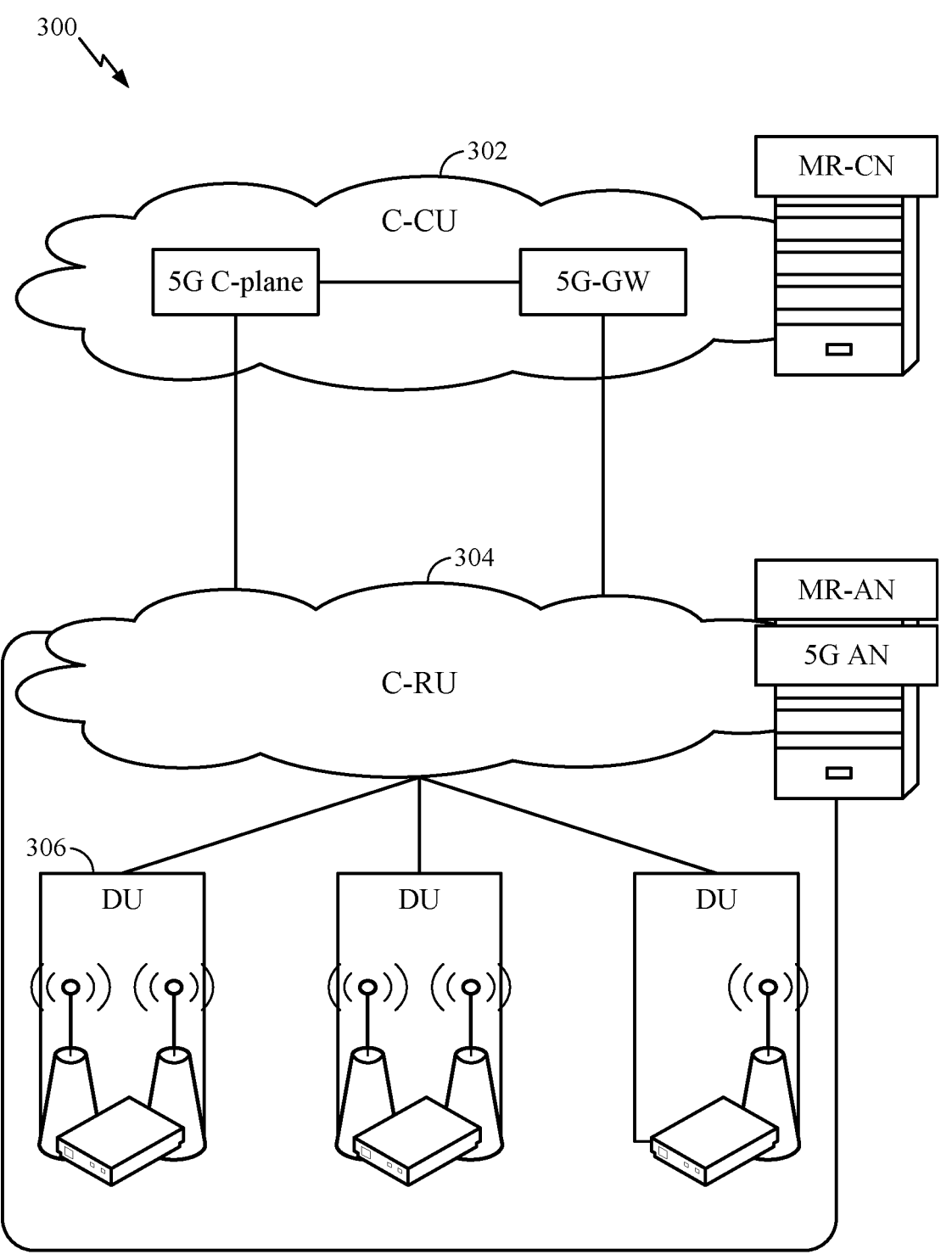
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
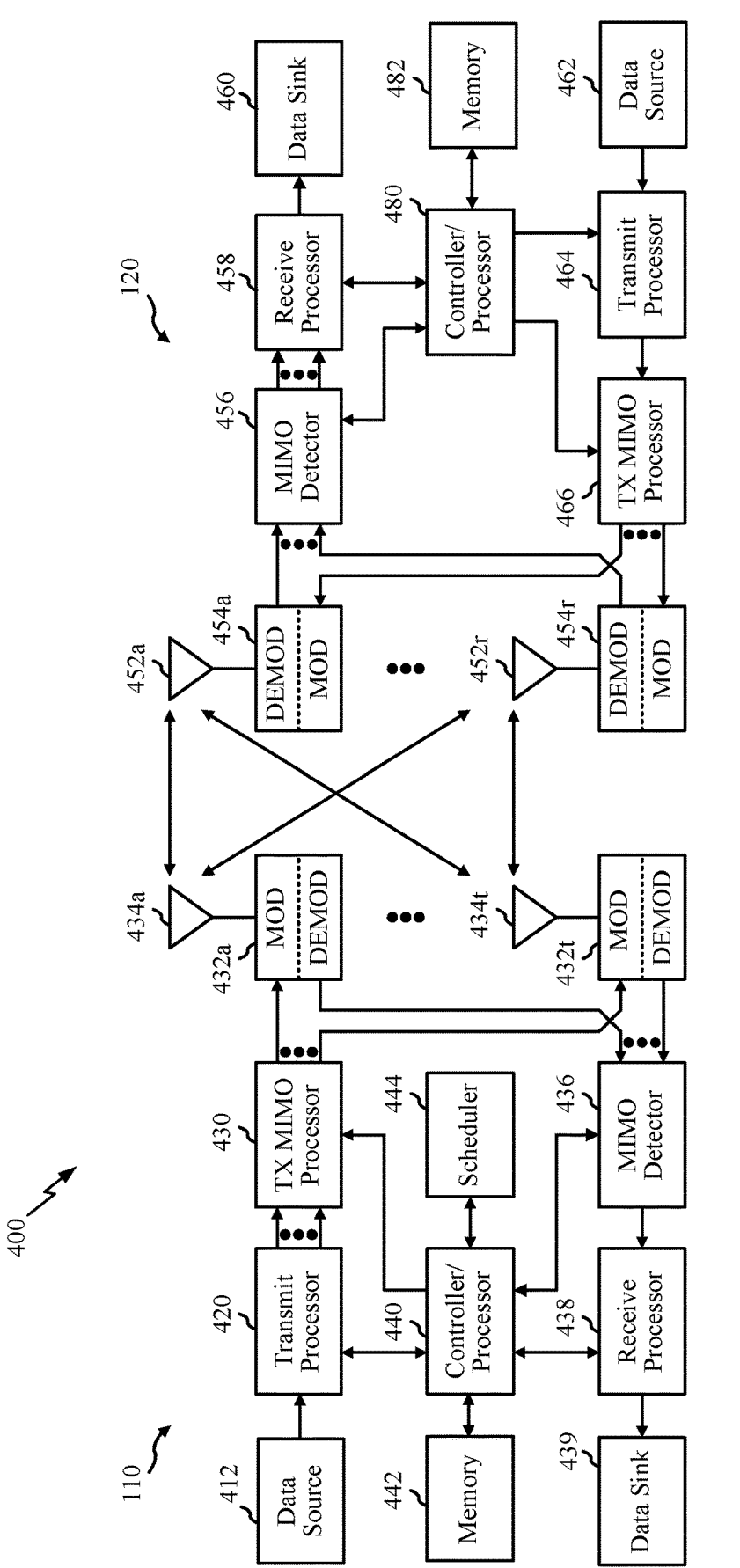
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 may perform (or be used to perform) operations 800 of FIG. 8. Similarly, antennas 434, processors 420, 430, 438, and/or controller/processor 440 of the BS 110 may perform (or be used to perform) operations 700 of FIG. 7.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 5:
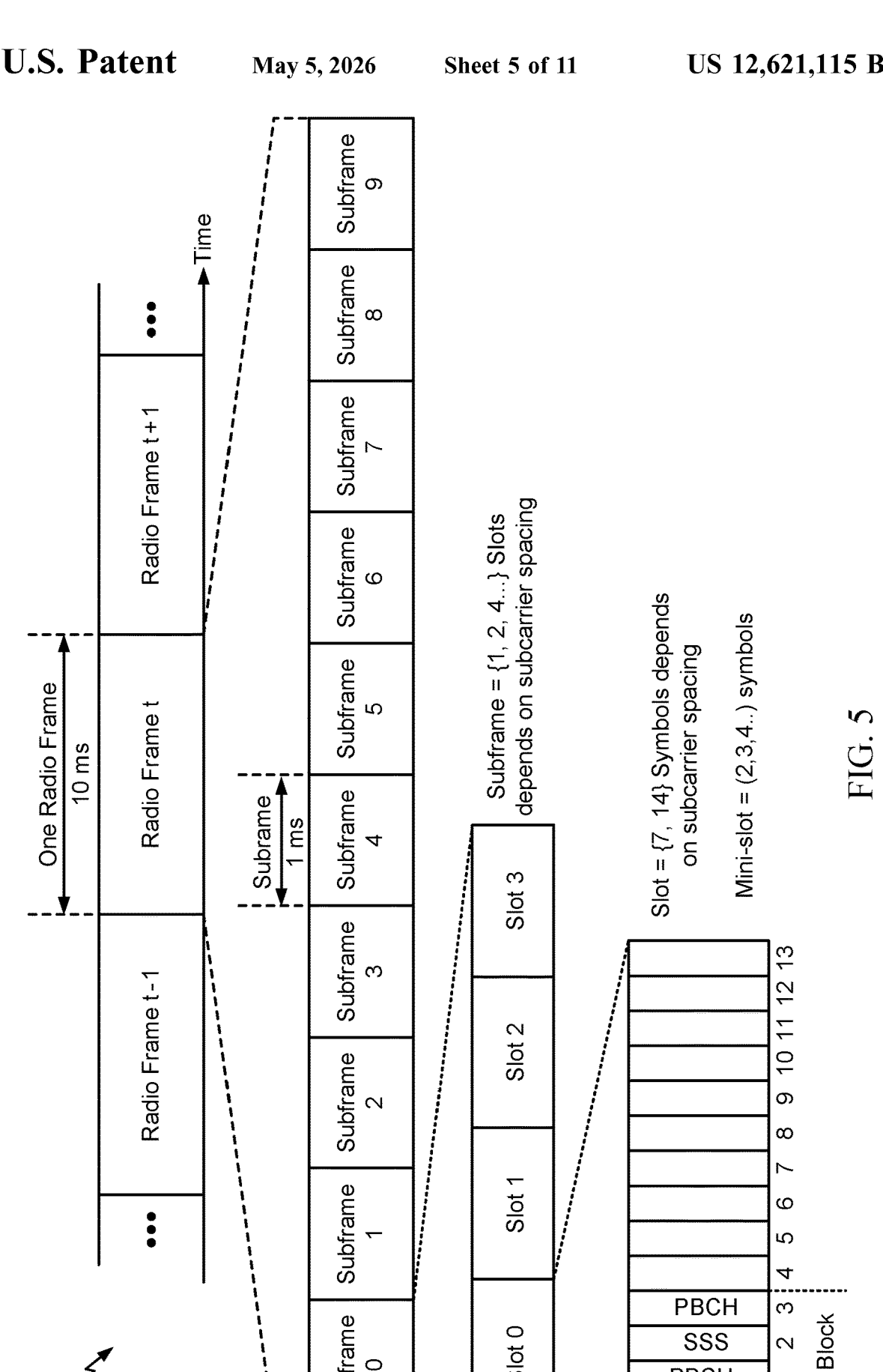
FIG. 5 illustrates an example of a frame format for a new radio (NR) system, in accordance with certain aspects of the present disclosure.

FIG. 5 is a diagram showing an example of a frame format 500 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 5. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIGs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Inter-Band Carrier Aggregation

Multiple component carriers (CCs) may be used in carrier aggregation (CA) scenarios to widen bandwidth and increase per-link data rates. CA may be used in systems utilizing frequency division duplexing (FDD), time division duplexing (TDD), or both. For example, the aggregated carriers can be a combination of any FDD carriers and TDD carriers.

In some aspects, a UE that is capable of CA can be allocated downlink (DL) and uplink (UL) resources on the aggregated resources including up to 16 CCs, according to the UE's capability. In general, the number of UL CCs does not exceed the number of DL CCs.

For practical reasons, CA may be specified for a large number of combinations of operating bands and number of CCs. To specify different CA combinations, CA bandwidth classes or CA configurations may be used. A CA bandwidth class indicates a combination of maximum aggregated bandwidth and maximum number of CCs, while a CA configuration indicates a combination of operating band(s) and CA bandwidth class(es).

In the case of inter-band CA, up to three operating bands may be supported in current systems. Different CCs can thus be planned to provide different coverage. In some cases, inter-band CA can be deployed to improve UL coverage and overcome issues due to higher pathloss on higher frequency.

In implementing CAs, there may be tradeoffs (in terms of cost and performance) between using two operating bands compared to using three operating bands. In an example, there are three operating bands available for inter-band CA, such as N28 (FDD band@700 MHz, 2*30 MHz for DL and UL), N41 (TDD band@2.6 GHz, 100 MHz+60 MHz), and N79 (TDD band@4.9 GHz, 100 MHz).

For example, some inter-band CA with 2 operating bands has advantages in good DL and UL performance at the cell center (e.g., PCC@N41+SCC@N79) but suffers from poor DL performance at cell edge (e.g., PCC@N28+SCC@N41 or N79) due to limited DL bandwidth.

Figure 6A:
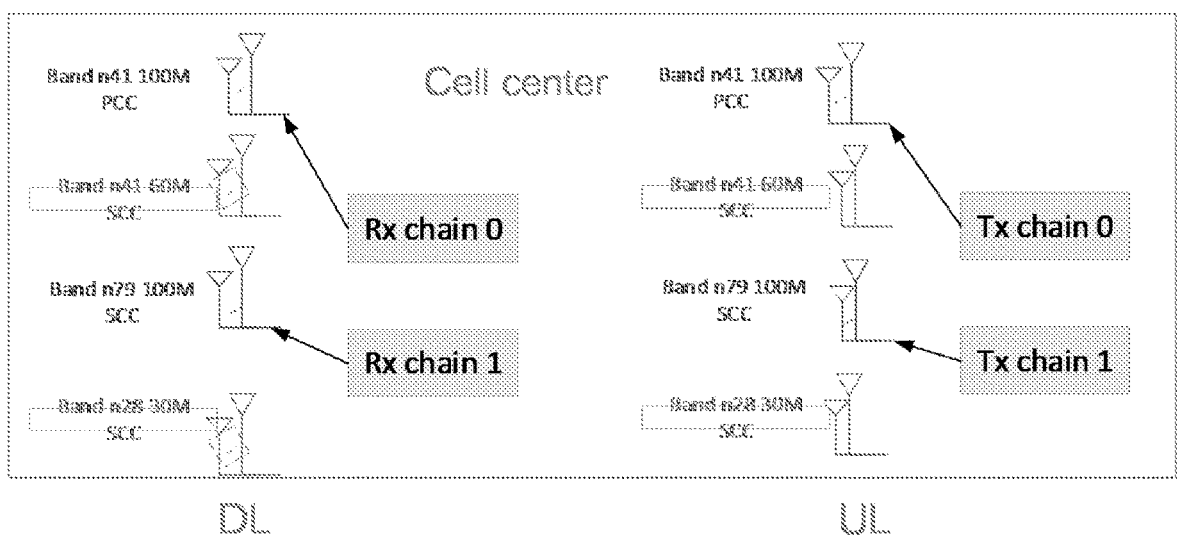
FIGS. 6A and 6B illustrate diagrams of example scenarios of a UE configured to have simultaneous connections to a number of operating bands, respectively at cell center in FIG. 6A and at cell edge in FIG. 6B, in accordance with certain aspects of the present disclosure.
Figure 6B:
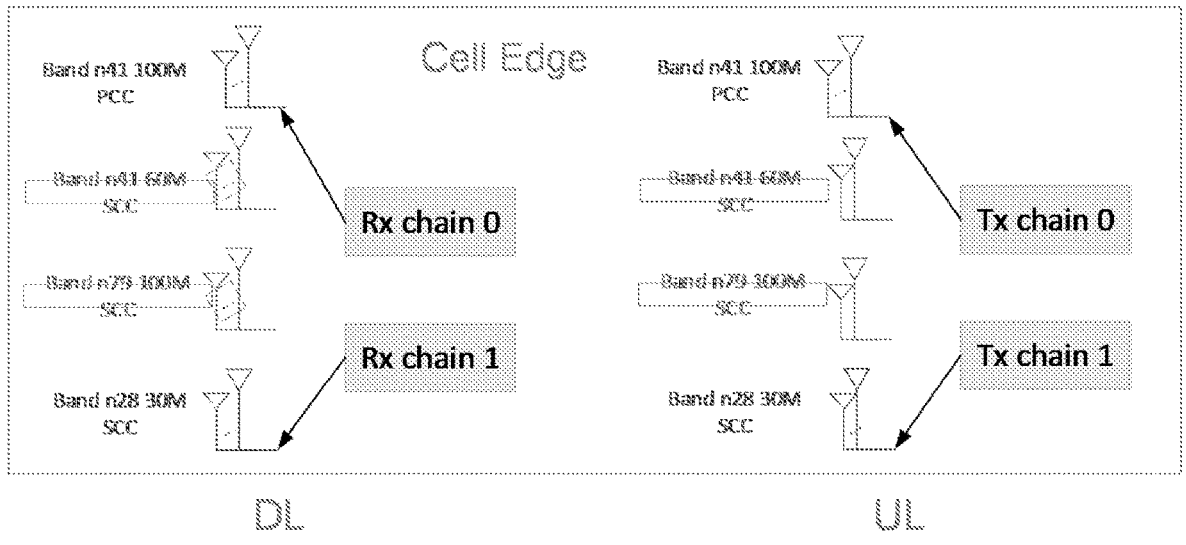

This example is shown in FIGS. 6A and 6B below. Some inter-band CA with 3 operating bands has advantages in good DL and UL performance at cell center (e.g., PCC@N41+SCC@N79+SCC@n28) and cell edge (PCC@N28+SCC@N41+SCC@N79) but would be prohibitively expensive due to the requirement of at least three independent radio frequency (RF) receiving chains required for such operation.

FIGS. 6A and 6B illustrate diagrams of example scenarios of UEs configured to have simultaneous connections in a number of operating bands, at cell center in FIG. 6A and at cell edge in FIG. 6B. Conventional configurations may configure up to two CCs for simultaneous communications. In addition, the UL CCs are normally limited to the same CCs used for DL. For a UE at cell center, only one combination of 2 CCs out of totally 4 DL CCs would be implemented.

As shown at the cell center of FIG. 6A, the receptions chains 0 and 1 may respectively be configured with Band N41 at the PCC and Band N79 at the SCC. The transmission chains 0 and 1 may respectively be configured the same with Band N41 at the PCC and N79 at the SCC. Thus, with this configuration, the UE may achieve 200 MHz bandwidth on both the uplink and downlink at the cell center.

As shown in FIG. 6B, the reception chains 0 and 1 may respectively be configured with Band N41 at the PCC and Band N28 at the SCC. The transmission chains 0 and 1 are configured the same. For at UE at cell edge, a low frequency CC (such as N28) is used for improve UL coverage while poor DL performance due to a corresponding limited DL bandwidth (such as 30 MHz@N28). In other words, with this configuration, the UE may achieve only 130 MHz bandwidth on both the uplink and downlink at the cell edge.

Such configuration limits the performance and use of CA. The present disclosure provides techniques to enable the use of available CCs not constrained to the same DL/UL configurations as shown in the FIGS. 6A and 6B.

Example Fast Switching Among Multiple
Component Carriers (CCs)

Aspects of the present disclosure relate to wireless communications, and more particularly, to techniques for switching a UE among multiple CCs based on capability of the UE, such that the UE is configured with a number of activated CCs that exceeds a number of CCs supported by the UE for simultaneous communications.

For example, the UE may be capable to switch among a number of activated CCs. The number of activated CCs available for switching is greater than the number of CCs supported by the UE for simultaneous continuous communications. While the configured (or activated) UL CCs are normally limited to the same CCs used for DL, the actual used CCs for DL and UL may be different. Switching enables the UE to optimize or maximize the use of bandwidth and to achieve a high DL or UL data rate.

FIG. 7 is a flow diagram illustrating example operations 700 for wireless communications by a network entity, in accordance with certain aspects of the present disclosure. Operations 700 may be performed, for example, by a BS 110 in the wireless communication network 100.

Operations 700 begin, at 702, by receiving, from a UE, capability signaling indicating a capability of the UE in switching among multiple CCs.

At 704, the network entity configures the UE with a number of activated CCs that exceeds a number of CCs supported by the UE for simultaneous communications. At 706, the network entity schedules the UE for communications on the activated CCs, based on the indicated capability of the UE to switch among CCs.

FIG. 8 is a flow diagram illustrating example operations 800 for wireless communications that may be considered complementary to operations 800 of FIG. 8. For example, operations 800 may be performed by a UE (e.g., such as a UE 120 in the wireless communication network 100) that is capable of quickly switching between CCs when communicating with a network entity (performing operations 700 of FIG. 7).

Operations 800 begin, at 802, by transmitting, to a network entity, capability signaling indicating a capability of the UE in switching among multiple CCs. At 804, the UE receives signaling configuring the UE with a number of activated CCs that exceeds the number of CCs supported by the UE for simultaneous communications. At 806, the UE switches among CCs for communications on the activated CCs, in accordance with the indicated capability of the UE to switch among CCs.

Operations 700 and 800 of FIGS. 7 and 8 may be understood with reference to various examples shown in FIGS. 9A and 9B and described below.

Figure 9A:
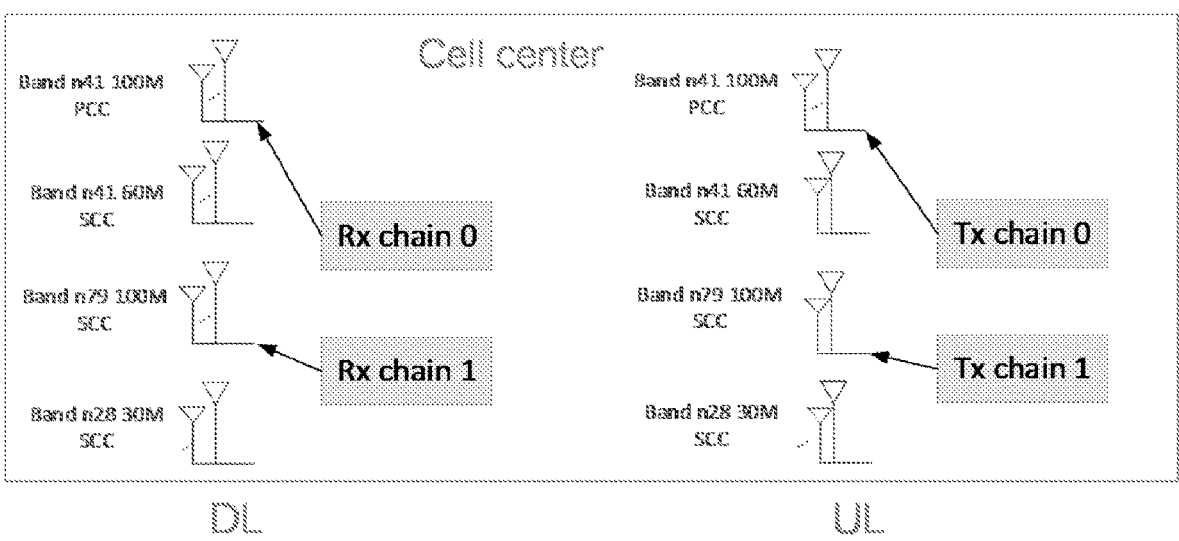
FIGS. 9A and 9B illustrate diagrams of example scenarios of a UE configured to switch between two or more operating bands, respectively at cell center in FIG. 9A and at cell edge in FIG. 9B, in accordance with certain aspects of the present disclosure.
Figure 9B:
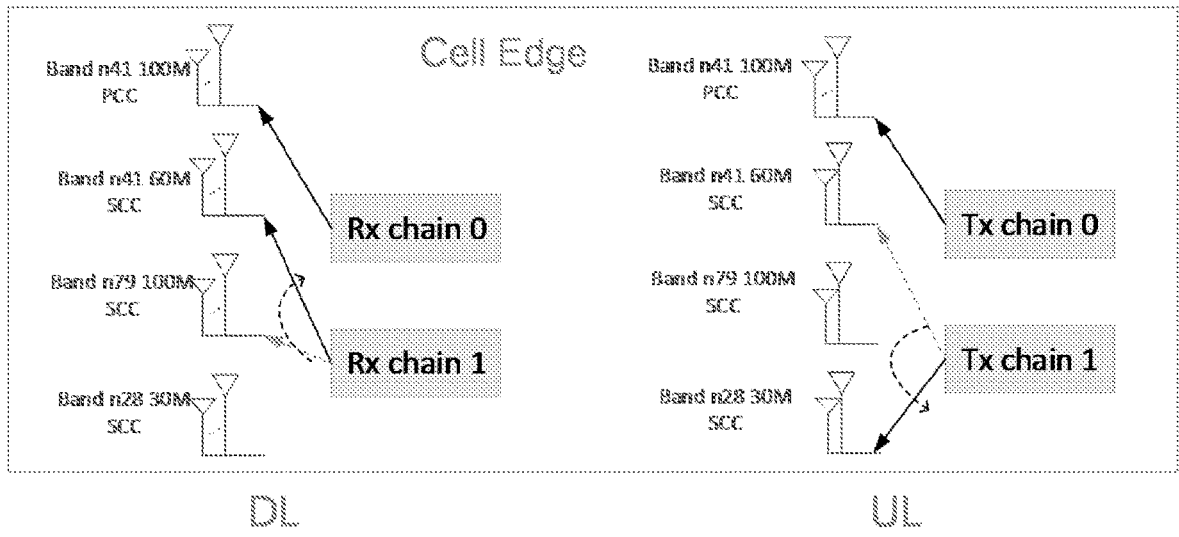

FIGS. 9A and 9B illustrate diagrams of example scenarios of UEs configured to switch between two or more operating bands, at cell center in FIG. 9A and at cell edge in FIG. 9B. In the examples shown, the UE reports its capability to gNB to indicate that the UE supports fast receiving switching among multiple DL CCs. In some aspects, the UE also reports its capability in supporting fast transmitting switching among multiple UL CCs. The UE may report to the gNB the capability for both DL CCs and UL CCs jointly or separately.

In one aspect, the UE may be configured with up to $N_{DL}$ DL carriers and up to $N_{UL}$ UL carriers as activated CC. The gNB may configure the UE based on the UE's capabilities of fast transmission or reception switching among CCs. Absent the switching, the UE may support a maximum number $M_{DL}$ of simultaneous receiving DL carriers, and/or $M_{UL}$ of simultaneous transmitting UL carriers. In other words, the capability signaling from the UE may indicate at least one of $M_{DL}$ or $M_{UL}$ supported by the UE for simultaneous transmission.

If the UE indicates the capability to switch quickly between CCs, however, the gNB can configure the UE with more active CCs than the maximum ($M_{DL}$ or $M_{UL}$) supported by the UE for simultaneous transmission, such that $N_{DL} \geq M_{DL}$ and/or $N_{UL} \geq M_{UL}$, (typically $N_{DL} \geq N_{UL}$).

If the number of actual activated DL CCs is greater than $M_{DL}$ and/or the number of actual activated UL CCs is greater than $M_{UL}$, only part of activated DL carriers (up to $M_{DL}$) and part of activated UL carriers (up to $M_{UL}$) will be used for PDSCH receiving and PUSCH transmission (1) dynamically or (2) semi-statically, as discussed below.

For dynamic switching among CCs, which CCs will be used for actual PDSCH receiving and/or PUSCH transmission can be based on the gNB scheduling (e.g., via a PDCCH carrying a DCI). In such cases, the gNB may consider a switching gap (e.g., when switching from CC1 to CC2), based on the capability signaling, when scheduling the PDSCH and/or PUSCH.

In some aspects in dynamic switching situations, scheduling information is from a primary cell (PCell). As such, cross-carrier scheduling can be used (e.g., to schedule PDSCH transmissions on one or more activated SCells).

For semi-static switching among CCs, which CCs will be used for actual PDSCH receiving and/or PUSCH transmission may be indicated via at least one of radio resource control (RRC) signaling or a medium access control (MAC) control element (CE). For example, the RRC signaling or MAC CE may be transmitted via a CC of a primary cell (PCell) and indicates one or more secondary cell (SCell) CCs on which the PDSCH or PUSCH is scheduled. The scheduling information can be from both PCell and SCell.

In such semi-static switching situations, the scheduling information can be from either PCell or one or more SCells (i.e., both cross-carrier scheduling and self-carrier scheduling may be used). In some cases, a UE may only monitor the PDCCH for SCells which are indicated as receiving/transmitting SCell in RRC or MAC-CE. For the SCells which are indicated as non-receiving cell for PDSCH or non-transmitting SCell for PUSCH, UE will continue performing CSI measurements and beam management if measurement gap is configured on DL and transmitting SRS via SRS carrier switching if configured.

As shown in FIG. 9A, at the cell center, four CCs are configured to achieve the maximum bandwidth and data rate. As shown, both DL and UL communications are with Bands N41 @ 100 MHz and N79 @ 100 MHz.

As the UE moves to the cell edge, as shown in FIG. 9B, the DL reception switches to Band N41 @ 60 MHz for the reception chain 1, while the UL transmission switches to Band N28 @ 30 MHz for the transmission chain 1. By switching to different DL and UL CCs, good DL performance can be achieved with higher bandwidth even if N28 is used for UL coverage improvement. With the ability to quickly switch as shown in FIG. 9B, the UE may be able to achieve 160 MHz bandwidth on the downlink at the cell edge, a significant increase relative to the 130 MHz downlink bandwidth for the example shown in FIG. 6A.

In this manner, the UE supports both inter-band CA with two operating bands in simultaneous communications and inter-band CA with three or more (such as four or more in other examples) operating bands by switching. For DL CA, any combination of two DL carriers out of totally four DL carriers may be achieved by dynamically scheduling or semi-static configured.

Figure 10:
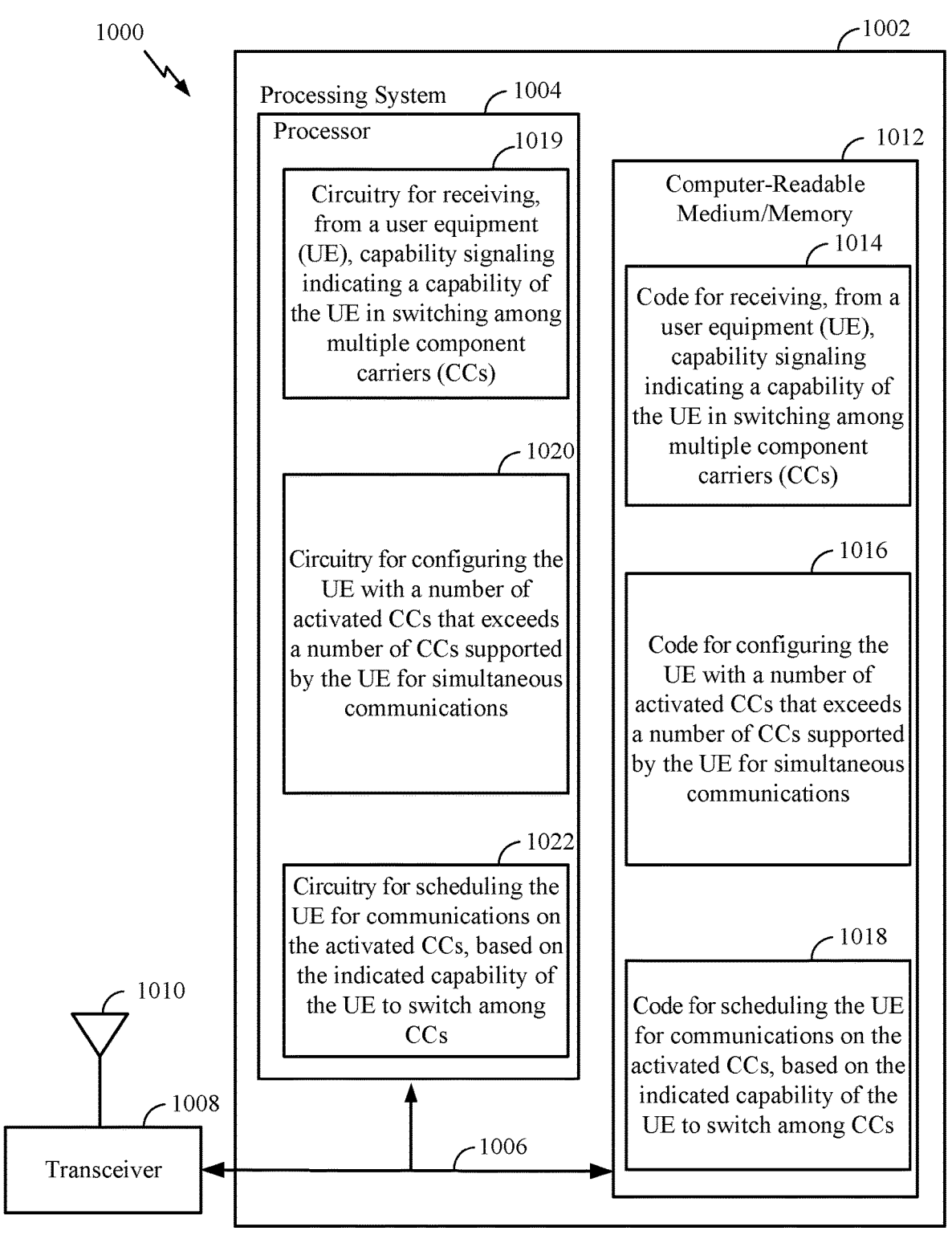
FIG. 10 illustrates a communications device that may include various components configured to perform operations for the techniques disclosed herein, in accordance with aspects of the present disclosure.

FIG. 10 illustrates a communications device 1000 (e.g., a gNB) that may include various components (e.g., corresponding to means-plus-function components) configured to perform operations for the techniques disclosed herein, such as the operations 700 illustrated in FIG. 7. The communications device 1000 includes a processing system 1002 coupled to a transceiver 1008 (e.g., a transmitter and/or a receiver). The transceiver 1008 is configured to transmit and receive signals for the communications device 1000 via an antenna 1016, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations 700 illustrated in FIG. 7, or other operations for performing the various techniques discussed herein. In certain aspects, computer-readable medium/memory 1012 stores code 1014 for receiving, from a user equipment (UE), capability signaling indicating a capability of the UE in switching among multiple component carriers (CCs), code 1016 for configuring the UE with a number of activated CCs that exceeds a number of CCs supported by the UE for simultaneous communications, and code 1018 for scheduling the UE for communications on the activated CCs, based on the indicated capability of the UE to switch among CCs. In certain aspects, the processor 1004 has circuitry configured to implement the code stored in the computer-readable medium/memory 1012. The processor 1004 includes circuitry 1019 for receiving, from a user equipment (UE), capability signaling indicating a capability of the UE in switching among multiple component carriers (CCs), circuitry 1020 for configuring the UE with a number of activated CCs that exceeds a number of CCs supported by the UE for simultaneous communications, and circuitry 1022 for scheduling the UE for communications on the activated CCs, based on the indicated capability of the UE to switch among CCs.

Figure 11:
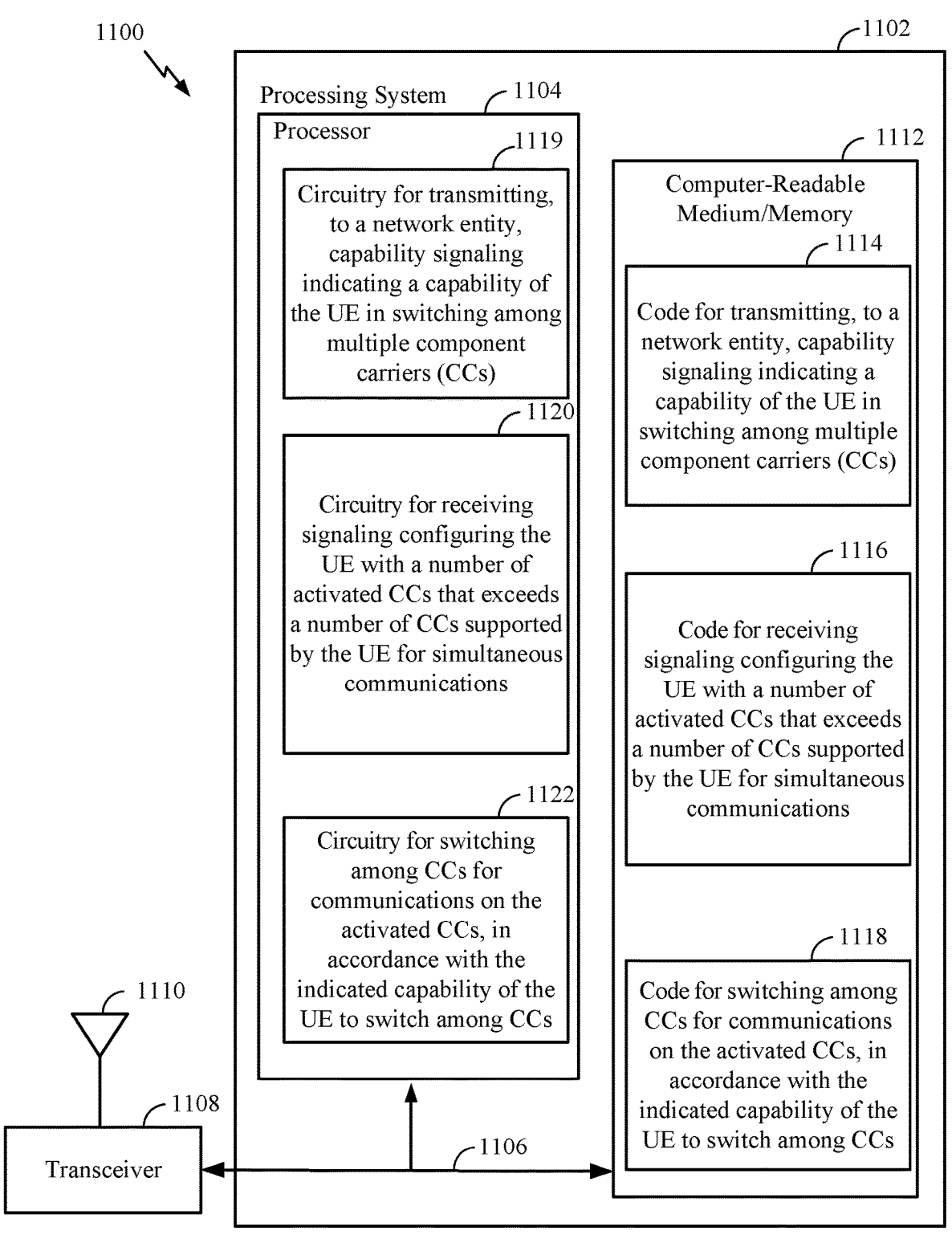
FIG. 11 illustrates a communications device that may include various components configured to perform operations for the techniques disclosed herein, in accordance with aspects of the present disclosure.

FIG. 11 illustrates a communications device 1100 (e.g., a UE) that may include various components (e.g., corresponding to means-plus-function components) configured to perform operations for the techniques disclosed herein, such as the operations 800 illustrated in FIG. 8. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations 800 illustrated in FIG. 8, or other operations for performing the various techniques discussed herein. In certain aspects, computer-readable medium/memory 1112 stores code 1114 for transmitting, to a network entity, capability signaling indicating a capability of the UE in switching among multiple component carriers (CCs), code 1116 for receiving signaling configuring the UE with a number of activated CCs that exceeds a number of CCs supported by the UE for simultaneous communications, and code 1118 for switching among CCs for communications on the activated CCs, in accordance with the indicated capability of the UE to switch among CCs. In certain aspects, the processor 1104 has circuitry configured to implement the code stored in the computer-readable medium/memory 1112. The processor 1104 includes circuitry 1119 for transmitting, to a network entity, capability signaling indicating a capability of the UE in switching among multiple component carriers (CCs), circuitry 1120 for receiving signaling configuring the UE with a number of activated CCs that exceeds a number of CCs supported by the UE for simultaneous communications, and circuitry 1122 for switching among CCs for communications on the activated CCs, in accordance with the indicated capability of the UE to switch among CCs.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 7, and/or FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by at a network entity, comprising:
   receiving, from a user equipment (UE), capability signaling indicating a capability of the UE in switching among multiple component carriers (CCs), wherein the capability signaling indicates at least one of a maximum number of downlink CCs supported by the UE for simultaneous reception or a maximum number of uplink CCs supported by the UE for simultaneous transmission;

configuring the UE with a number of activated CCs that exceeds a number of CCs supported by the UE for simultaneous communications, wherein the configuring comprises at least one of:

configuring the UE with a number of activated downlink CCs that exceeds the maximum number of downlink CCs supported by the UE for simultaneous reception; or configuring the UE with a number of activated uplink CCs that exceeds the maximum number of uplink CCs supported by the UE for simultaneous transmission; and scheduling the UE for communications on the activated CCs, based on the indicated capability of the UE to switch among CCs, wherein scheduling the UE for communications on the activated CCs comprises indicating, via a physical downlink control channel (PDCCH) on a first CC, one or more of the activated CCs for the UE to use for a physical uplink shared channel (PUSCH).

2. The method of claim 1, wherein scheduling the UE for communications on the activated CCs comprises indicating, via a physical downlink control channel (PDCCH) on a first CC, one or more of the activated CCs that will be used for a physical downlink shared channel (PDSCH).

3. The method of claim 2, wherein the network entity considers a switching gap, based on the capability signaling, when scheduling the PDSCH.

4. The method of claim 1, wherein scheduling the UE for communications on the activated CCs comprises indicating, via a physical downlink control channel (PDCCH) on a first CC, one or more of the activated CCs for the UE to use for a physical uplink shared channel (PUSCH).

5. The method of claim 4, further comprising considering a switching gap, based on the capability signaling, when scheduling the PUSCH.

6. The method of claim 1, wherein scheduling the UE for communications on the activated CCs comprises indicating, via at least one of radio resource control (RRC) signaling or a medium access control (MAC) control element (CE), one or more of the activated CCs that will be used for at least one of a physical downlink shared channel (PDSCH) or a physical uplink shared channel (PUSCH).

7. The method of claim 6, wherein the RRC signaling or MAC CE is transmitted via a CC of a primary cell and indicates one or more secondary cell CCs on which the PDSCH or PUSCH is scheduled.

8. The method of claim 6, wherein the RRC signaling or MAC CE is transmitted via a CC of one or more secondary cells on which the PDSCH or PUSCH is scheduled.

9. A method for wireless communication at a user equipment (UE), comprising:

transmitting, to a network entity, capability signaling indicating a capability of the UE in switching among multiple component carriers (CCs), wherein the capability signaling indicates at least one of a maximum number of downlink CCs supported by the UE for simultaneous reception or a maximum number of uplink CCs supported by the UE for simultaneous transmission;

receiving signaling configuring the UE with a number of activated CCs that exceeds a number of CCs supported by the UE for simultaneous communications, wherein the UE is configured with at least one of:

a number of activated downlink CCs that exceeds the maximum number of downlink CCs supported by the UE for simultaneous reception; or a number of activated uplink CCs that exceeds the maximum number of uplink CCs supported by the UE for simultaneous transmission; and switching among CCs for communications on the activated CCs, in accordance with the indicated capability of the UE to switch among CCs.

10. The method of claim 9, wherein the UE is scheduled for communications on the activated CCs via a physical downlink control channel (PDCCH) on a first CC, one or more of the activated CCs that will be used for at least one of a physical downlink shared channel (PDSCH) or a physical uplink shared channel (PUSCH).

11. The method of claim 9, wherein the UE is scheduled for communications on the activated CCs via at least one of radio resource control (RRC) signaling or a medium access control (MAC) control element (CE), one or more of the activated CCs that will be used for a physical downlink shared channel (PDSCH) or a physical uplink shared channel (PUSCH).

12. The method of claim 11, wherein the RRC signaling or MAC CE is transmitted via a CC of a primary cell and indicates one or more secondary cell CCs indicated as receiving or transmitting.

13. The method of claim 12, wherein the UE only monitors the secondary cell CCs indicated as receiving or transmitting for the PDCCH.

14. The method of claim 11, wherein the RRC signaling or MAC CE is transmitted via a CC of one or more secondary cells on which the PDSCH or PUSCH is scheduled.

15. The method of claim 11, further comprising at least one of:

performing channel state information (CSI) measurement and bean management for secondary cell CCs that are not indicated as receiving if a measurement gap is configured on the downlink; or transmitting sounding reference signals (SRS) via SRS carrier switching, if SRS carrier switching is configured.

16. A method for wireless communication at a network entity, comprising:

receiving, from a user equipment (UE), capability signaling indicating a capability of the UE in switching among multiple component carriers (CCs);

configuring the UE with a number of activated CCs that exceeds a number of CCs supported by the UE for simultaneous communications; and scheduling the UE for communications on the activated CCs, based on the indicated capability of the UE to switch among CCs, wherein scheduling the UE for communications on the activated CCs comprises indicating, via a physical downlink control channel (PDCCH) on a first CC, one or more of the activated CCs for the UE to use for a physical uplink shared channel (PUSCH).

17. The method of claim 16, further comprising considering a switching gap, based on the capability signaling, when scheduling the PUSCH.

* * * * *